(12) United States Patent
Saeda et al.

(10) Patent No.: US 11,818,804 B2
(45) Date of Patent: *Nov. 14, 2023

(54) INFORMATION PROCESSING DEVICE

(71) Applicant: SHARP KABUSHIKI KAISHA, Sakai (JP)

(72) Inventors: Masao Saeda, Sakai (JP); Yukio Kanaoka, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,324

(22) Filed: Jul. 25, 2022

(65) Prior Publication Data

US 2022/0361288 A1    Nov. 10, 2022

Related U.S. Application Data

(63) Continuation of application No. 17/123,745, filed on Dec. 16, 2020, now Pat. No. 11,438,967.

(30) Foreign Application Priority Data

Jan. 16, 2020   (JP) .................................. 2020-005196

(51) Int. Cl.
  *H04W 4/00*       (2018.01)
  *H04W 88/06*      (2009.01)
  (Continued)

(52) U.S. Cl.
  CPC .............. *H04W 88/06* (2013.01); *H04B 3/52* (2013.01); *H04B 3/54* (2013.01); *H04N 1/00281* (2013.01)

(58) Field of Classification Search
  CPC .............. G06K 7/0004; G06K 7/0056; G06K 7/10297; G06K 7/10316; H04B 3/52;
  (Continued)

(56) References Cited

U.S. PATENT DOCUMENTS

2005/0137942 A1   6/2005   LaFleur
2007/0125846 A1   6/2007   Hemingway et al.
(Continued)

FOREIGN PATENT DOCUMENTS

JP      2019-096974 A    6/2019

OTHER PUBLICATIONS

Notice of Allowance of U.S. Appl. No. 17/123,745 dated May 12, 2022.

*Primary Examiner* — Frank Duong
(74) *Attorney, Agent, or Firm* — ScienBiziP, P.C.

(57) ABSTRACT

An information processing system includes an information processing device provided with a housing. The information processing device includes: a placement section that is disposed on an upper surface of the housing, the placement section on which a portable communication object is placed; a wireless communicator that wirelessly communicates with the communication object placed on the placement section; and a first protrusion that extends in a left-right direction along a lower end of the placement section. The placement section includes a placement surface sloping downward from a back side toward a front side, the placement surface on which the communication object is placed. A step, forming a gap between the placement surface and the communication object, is disposed in a lower end portion of the placement surface.

10 Claims, 13 Drawing Sheets

(51) Int. Cl.
   *H04N 1/00*   (2006.01)
   *H04B 3/54*   (2006.01)
   *H04B 3/52*   (2006.01)

(58) Field of Classification Search
   CPC ........ H04B 3/54; H04N 1/00281; H04N 1/34; H04N 21/41415; H04W 74/08; H04W 80/04; H04W 84/12; H04W 84/18; H04W 88/06; H04W 88/08; Y10S 902/30
   See application file for complete search history.

(56) References Cited

U.S. PATENT DOCUMENTS

| | | |
|---|---|---|
| 2007/0247641 A1 | 10/2007 | Okuma et al. |
| 2011/0153071 A1 | 6/2011 | Claessen |
| 2011/0192681 A1 | 8/2011 | Johnson et al. |
| 2013/0053136 A1* | 2/2013 | LeMay ................ G07F 17/32 463/29 |
| 2017/0163829 A1 | 6/2017 | Fujioka |
| 2018/0284940 A1 | 10/2018 | Chin |
| 2019/0129566 A1 | 5/2019 | Toriyama |
| 2019/0132460 A1 | 5/2019 | Sawano et al. |
| 2019/0289141 A1* | 9/2019 | Katsuyama ........ H04N 1/00315 |
| 2020/0258343 A1 | 8/2020 | Forutanpour et al. |

\* cited by examiner

INFORMATION PROCESSING DEVICE

BACKGROUND OF THE INVENTION

Field of the Invention

The present invention relates to an information processing device, and more particularly, to an information processing device including a near field wireless communicator provided on an inclined surface.

Description of the Background Art

An example of this type of the background art is described in Japanese Unexamined Patent Application Publication No. 2019-096974. An image forming device of the background art includes an operation display unit provided on a front surface of an upper portion of a housing. An upper surface of the operation display unit is an inclined surface sloping downward from the back side toward the front side. A reader/writer that executes wireless communication with an IC chip of a mobile terminal and reads/writes data to/from a storage provided in the IC chip is disposed on the upper surface of the operation display unit.

However, in the background art, the reader/writer is provided on the inclined surface; therefore, when wireless communication is executed between the reader/writer and a communication object, a user needs to support the communication object so that the communication object does not fall. In other words, when wireless communication is executed, the user cannot let go of the communication object, which is inconvenient.

In order to solve such a problem, it is conceivable that a protrusion as a stopper is disposed in a lower end portion of the reader/writer to allow the communication object to be placed on an upper surface of the reader/writer. However, when the protrusion is disposed in the lower end portion of the reader/writer, it may be difficult to take out the communication object from the upper surface of the reader/writer.

Thus, a main object of the present invention is to provide a new information processing device.

Another object of the present invention is to provide an information processing device that allows a communication object placed on a placement surface for near field wireless communication to be easily taken out.

SUMMARY OF THE INVENTION

A first invention is an information processing device including: a housing; a placement section that is disposed on an upper surface of the housing having a portable communication object placed thereon; a wireless communicator that wirelessly communicates with the communication object placed on the placement section; and a first protrusion that extends in a left-right direction along a lower end of the placement section. The placement section includes a placement surface sloping downward from a back side toward a front side, the placement surface having the communication object placed thereon. A step, forming a gap between the placement surface and the communication object, is disposed in a lower end portion of the placement surface.

A second invention is the information processing device according to the first invention, and the placement section is disposed entirely along the left-right direction of the lower end portion of the placement surface and is provided with a recess extending in the left-right direction.

A third invention is the information processing device according to the second invention. The upper surface of the housing is an inclined surface sloping downward from the back side toward the front side, and the placement surface includes a first inclined surface having an inclination angle identical to that of the upper surface of the housing, and a second inclined surface connected to a front side of the first inclined surface, forming a portion of the recess, and sloping downward from the first inclined surface toward the front side.

A fourth invention is the information processing device according to the first invention, and the placement section includes a second protrusion extending in the left-right direction at the lower end portion of the placement surface and being lower than the first protrusion.

A fifth invention is the information processing device according to any one of the first to fourth inventions, further including at least one light emitter disposed on the placement section.

A sixth invention is the information processing device according to the fifth embodiment. The placement section is formed in a rectangular shape, and four of the light emitters are respectively disposed in four corner portions of the placement section.

A seventh invention is the information processing device according to the sixth invention, further including a wireless communication mark disposed on the placement surface and serving as an index of a location over which the communication object is held. The wireless communication mark is arranged at a position in which diagonal lines of the four corner portions intersect on the placement surface.

An eighth invention is the information processing device according to the sixth or seventh invention. The wireless communicator includes a wireless communication antenna built in the housing, and the wireless communication antenna is arranged at a position in which diagonal lines of the four corner portions intersect.

A ninth invention is the information processing device according to any one of the sixth to eighth inventions, and lower two light emitters of the four light emitters are disposed respectively at opposite end portions of the first protrusion in a longitudinal direction thereof.

According to the present invention, a communication object placed on an inclined placement surface for near field wireless communication can be easily taken out.

The above object, other objects, features, and advantages of the present invention will be more apparent from the following detailed description of embodiments performed with reference to the drawings.

DESCRIPTION OF THE PREFERRED EMBODIMENTS

First Embodiment

Figure 1:
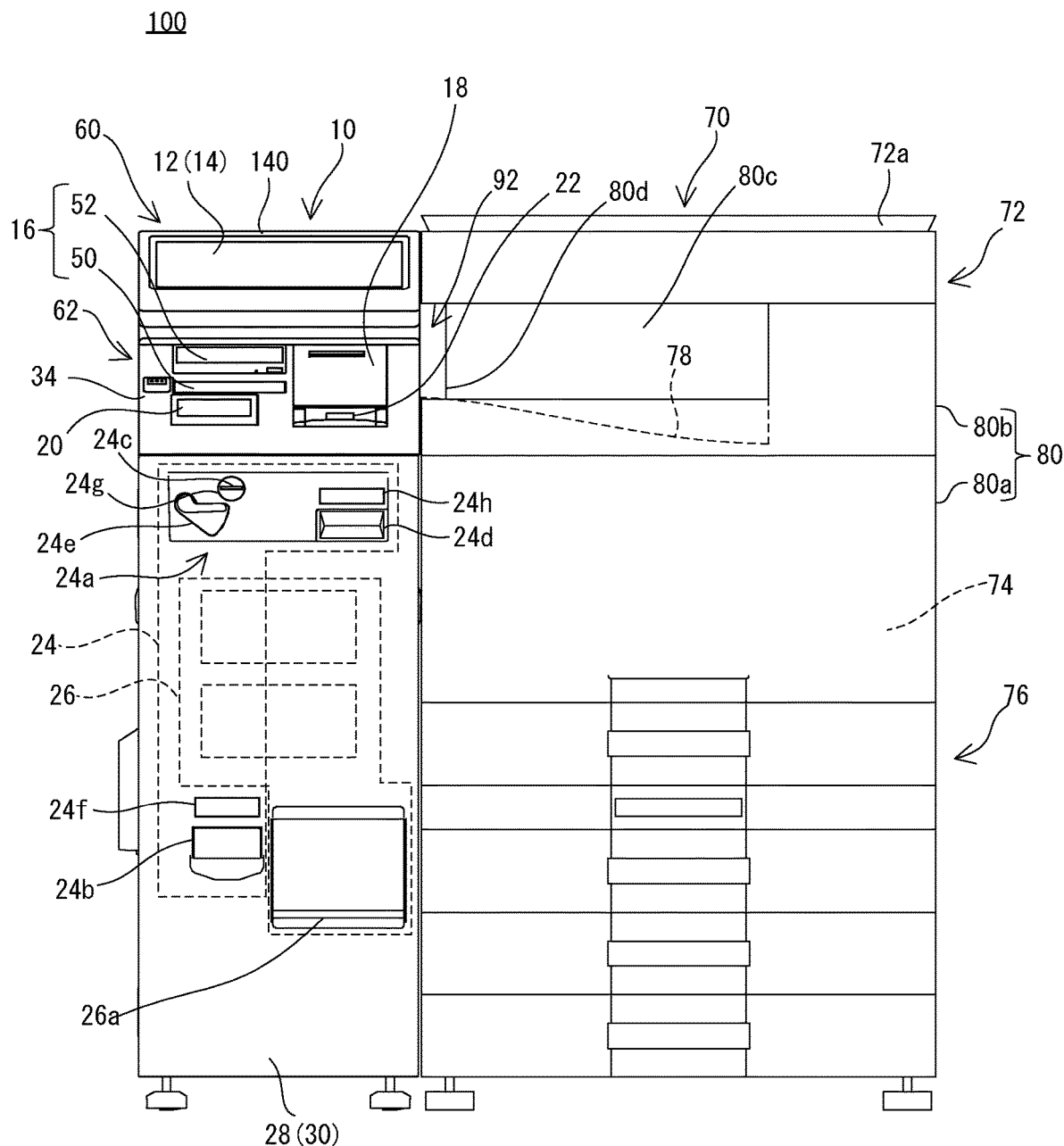
FIG. 1 is a front view schematically illustrating an external configuration of an image forming system according to an embodiment of the present invention.

With reference to FIG. 1, an image forming system 100 according to a first embodiment of the present invention includes an information processing device 10 and an image forming device 70.

The information processing device 10 is a multi-media kiosk (MMK) terminal that is placed (installed) in stores such as supermarkets, restaurants, and convenience stores, and public facilities such as stations, bus terminals, airports, government offices, and libraries. The information processing device 10 can provide various information or predetermined products or services to a user (users) depending on the place where the information processing device is placed, and includes a plurality of functions for providing various information, products, and services. For example, the information processing device 10 can provide a service for printing a photograph or the like to a user. Further, although the details will be described below, the information processing device 10 also can provide predetermined services such as copy, facsimile (FAX), scan, and printing to a user in cooperation with the image forming device 70.

In addition, in the specification, the surface opposed to a standing position of a user, that is, the surface on the side where a display surface of a display 14 described below is disposed is set as the front (front surface), and thereby the front-back direction (depth direction) of the information processing device 10 and components thereof is specified. The left-right direction (horizontal direction) of the information processing device 10 and components thereof are specified based on a state where the information processing device 10 is seen from the user. The same applies to the image forming device 70.

Figure 2:
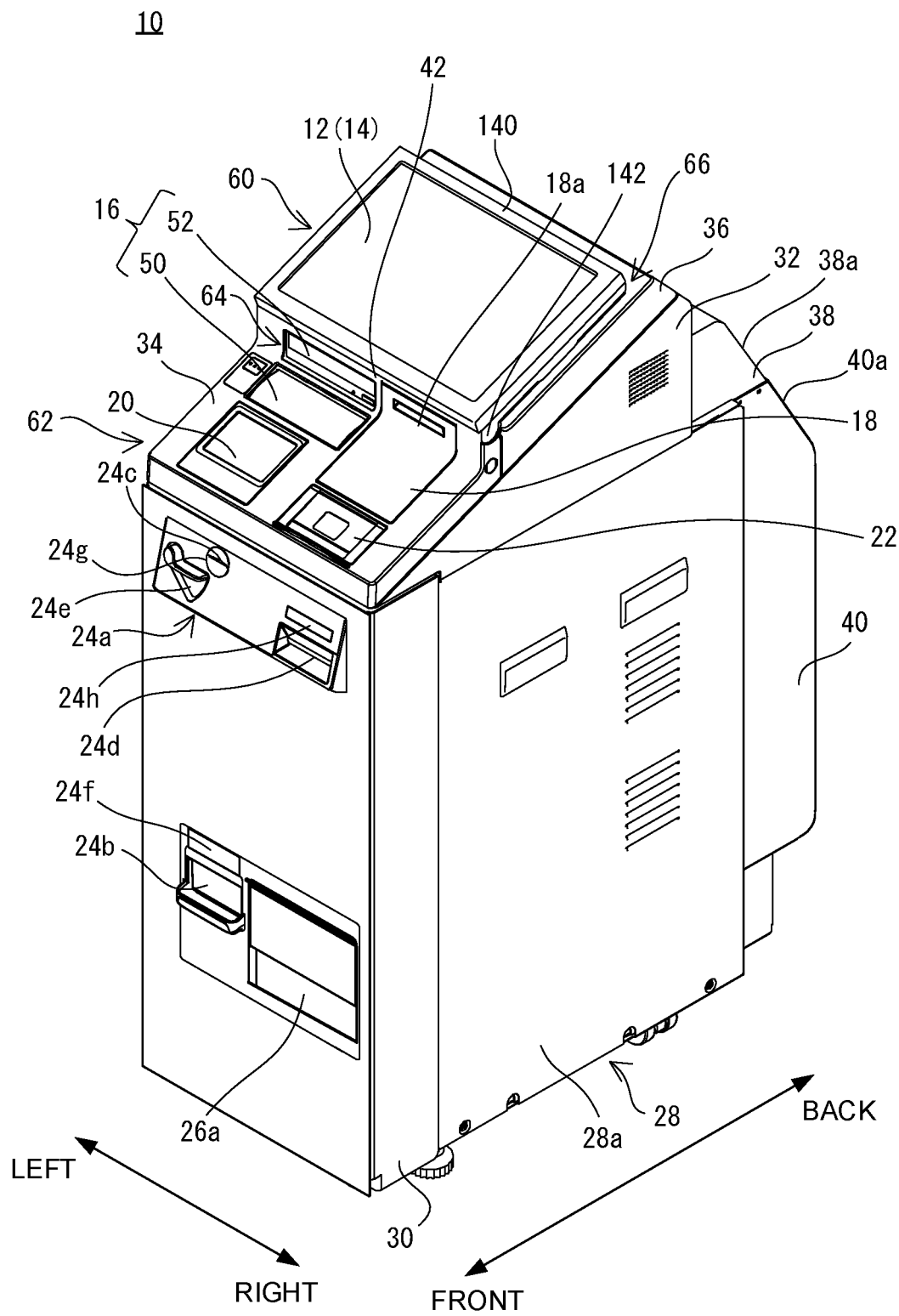
FIG. 2 is a perspective view schematically illustrating an external configuration of an information processing device.
Figure 3:
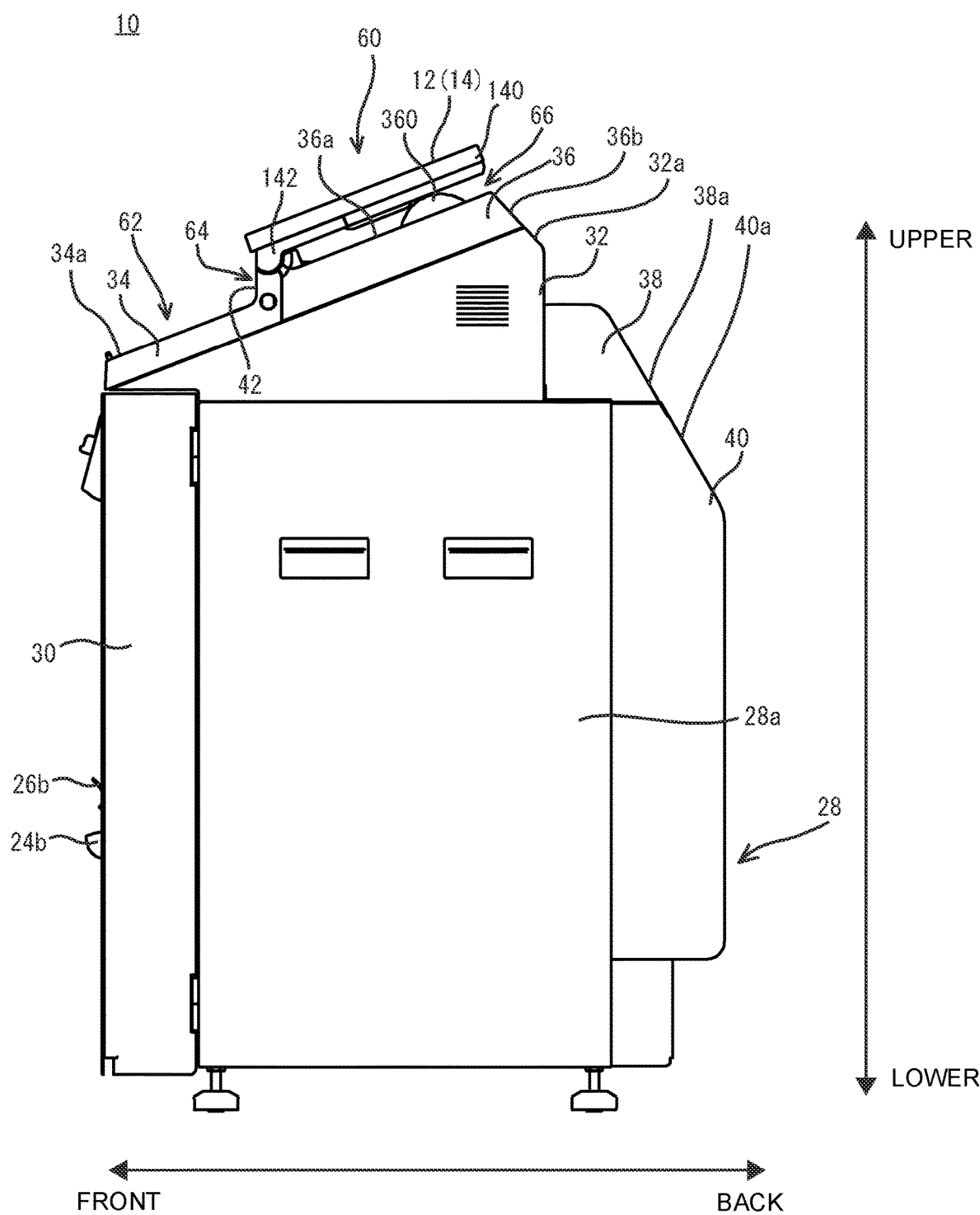
FIG. 3 is a side view illustrating the external configuration of the information processing device in a first state.
Figure 4:
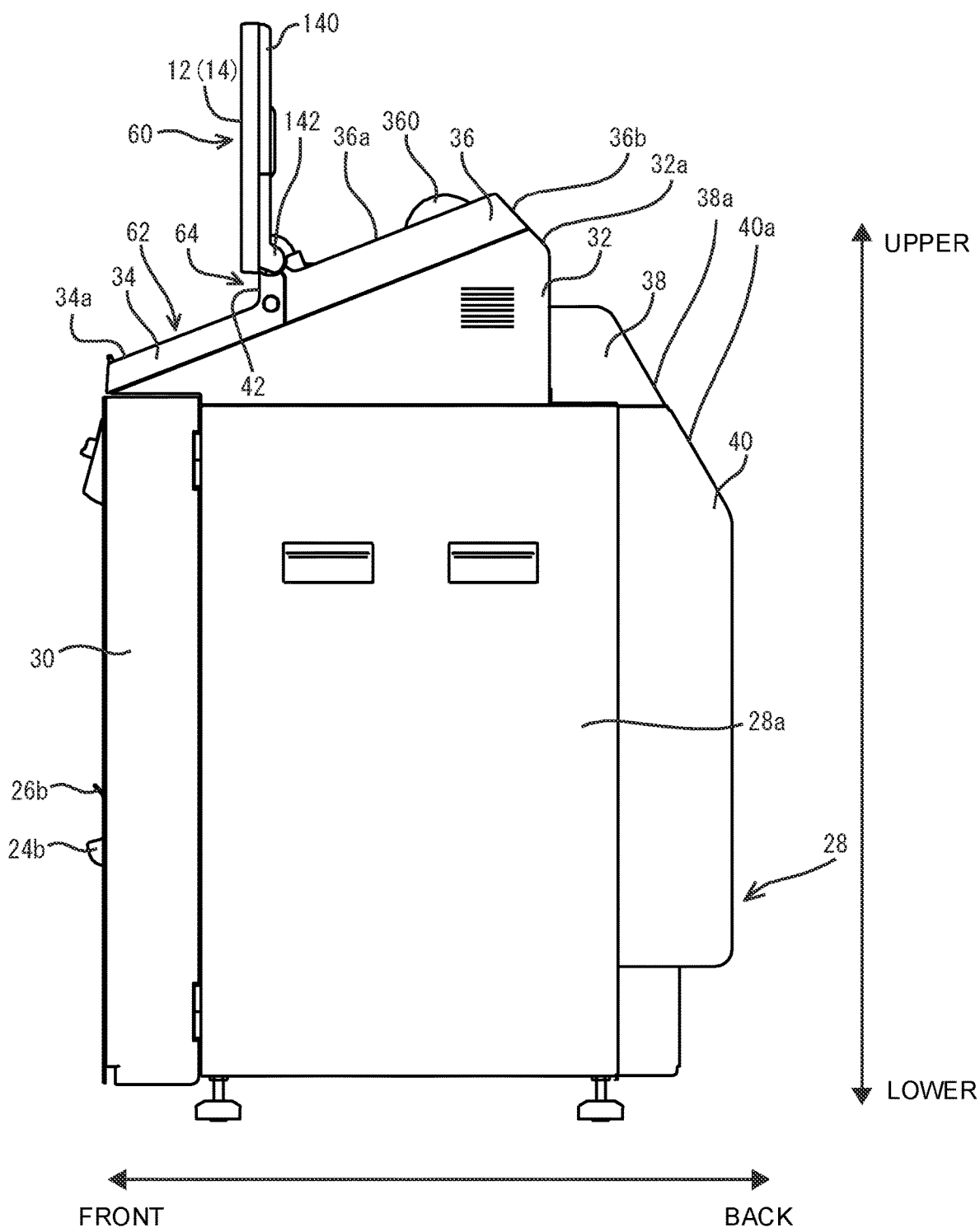
FIG. 4 is a side view illustrating the external configuration of the information processing device in a second state.

As illustrated in FIGS. 2 to 4, the information processing device 10 includes a housing 28. The housing 28 includes a lower housing 28a, a front cover (front door) 30, an upper housing 32, a front upper cover 34, a rear upper cover 36, an upper rear cover 38, and a lower rear cover 40.

The lower housing 28a is formed in a rectangular box shape, and casters or leg members are attached to a lower surface of the lower housing 28a. The lower housing 28a is placed via the casters or leg members on a floor surface of an installation location of the information processing device 10.

The front cover 30 is disposed on a front surface of the lower housing 28a, configures a front end portion of the housing 28, and is disposed openable and closable with respect to the lower housing 28a by using a hinge or the like.

The upper housing 32 is attached to an upper surface of the lower housing 28a. The front upper cover 34 and the rear upper cover 36 are attached to an upper surface of the upper housing 32. The front upper cover 34 and the rear upper cover 36 configure the most part of an upper end portion (upper surface) of the housing 28.

Note that the front upper cover 34 and the rear upper cover 36 are arranged adjacent to each other in the front-back direction. The front upper cover 34 is arranged at the front side of the upper surface of the upper housing 32 (for example, at the front half of the upper surface of the upper housing 32), and the rear upper cover 36 is arranged at the back side of the upper surface of the upper housing 32 (for example, at the rear half of the upper surface of the upper housing 32). In addition, a front end portion of the front upper cover 34 is located above the front cover 30, and the front end portion of the front upper cover 34 and an upper end portion of the front cover 30 is located adjacent to each other in the up-down direction.

As illustrated in FIGS. 3 and 4, an upper surface 34a of the front upper cover 34 and an upper surface 36a of the rear upper cover 36 are inclined surfaces sloping downward from the back side toward the front side. Note that inclination angles of the upper surface 34a of the front upper cover 34 and the upper surface 36a of the rear upper cover 36 with respect to the horizontal direction are substantially the same (for example, 30 degrees to the horizontal direction). In other words, the upper surface 34a of the front upper cover 34 and the upper surface 36a of the rear upper cover 36 are surfaces parallel to each other. As just described, the upper surface 34a of the front upper cover 34 and the upper surface 36a of the rear upper cover 36, which configure the upper surface of the housing 28 are both the inclined surfaces, and thus the upper surface of the housing 28 is an inclined surface.

Further, the rear upper cover 36 includes an inclined surface 36b extending from an upper end portion (a rear end portion) of the upper surface 36a of the rear upper cover 36 toward the back side (rearward). The inclined surface 36b is an inclined surface sloping downward from the front side toward the back side. Furthermore, the upper housing 32 includes an inclined surface 32a continuous with the back side of the inclined surface 36b and sloping downward from the front side to the back side. Note that inclination angles, respectively, of the inclined surface 36b of the rear upper cover 36 and the inclined surface 32a of the upper housing 32 with respect to the horizontal direction are substantially the same. In other words, the inclined surface 36b of the rear upper cover 36 and the inclined surface 32a of the upper housing 32 are surfaces substantially parallel to each other and substantially flush with each other.

As illustrated in FIGS. 2 to 4, the upper rear cover 38 is attached to a back surface of the upper housing 32, and the lower rear cover 40 is attached to a back surface of the lower housing 28a. Note that the upper rear cover 38 and the lower rear cover 40 are arranged adjacent to each other in the up-down direction. Further, as illustrated in FIGS. 3 and 4, a back surface 38a of the upper rear cover 38 is an inclined surface sloping downward from the front side toward the back side. Furthermore, the lower rear cover 40 includes an inclined surface 40a continuous with the back surface 38a of the upper rear cover 38 and sloping downward from the front side toward the back side. Note that inclination angles, respectively, of the back surface 38a of the upper rear cover 38 and the inclined surface 40a of the lower rear cover 40 with respect to the horizontal direction are substantially the same. In other words, the back surface 38a of the upper rear cover 38 and the inclined surface 40a of the lower rear cover 40 are surfaces substantially parallel to each other and substantially flush with each other.

The most part of the upper surface (top surface) of the housing 28 is configured in the order from the front side by the upper surface 34a of the front upper cover 34, the upper surface 36a of the rear upper cover 36, the inclined surface 36b of the rear upper cover 36, the inclined surface 32a of the upper housing 32, the back surface 38a of the upper rear cover 38, and the inclined surface 40a of the lower rear cover 40. As described above, the surfaces configuring the most part of the upper surface of the housing 28 are all inclined surfaces and thus are structured such that dust does not easily adhere to the upper surface of the housing 28 (dust does not easily gather).

Further, as illustrated in FIGS. 1 to 5, the information processing device 10 includes a plurality of operating components (operating devices) such as the display 14 with a touch panel 12, a memory connection 50, an optical disk connection 52, a paper strip printer 18, a code reader 20, a near field communicator 22, a money processing unit 24, and a photo printer 26. Each of the plurality of operating components is disposed so that functions of the information processing device 10 are exerted. A first operating unit 60, a second operating unit 62, and a third operating unit 64 are configured by the operating components.

Firstly, the first operating unit 60 will be described. The first operating unit 60 includes the display 14 with the touch panel 12 and a frame body (support member) 140. The touch panel 12 is a general-purpose touch panel, and a touch panel configured in any manner such as a capacitive touch panel, an electrostatic induction touch panel, a resistive touch panel, or an infrared touch panel can be applied as the touch panel 12. In the first embodiment, a capacitive touch panel is applied as the touch panel 12, and the touch panel 12 is disposed on the display surface of the display 14. Note that a touch panel display in which the touch panel 12 and the display 14 are integrally formed may be applied. For example, an LCD or electro-luminescence (EL) display or the like can be applied as the display 14. Various operation screens such as a home screen are displayed on the display 14 with the touch panel 12. The display 14 with the touch panel 12 is utilized as an input device that accepts an input operation (a user operation) by a user.

As illustrated in FIGS. 2 and 3, the display 14 with the touch panel 12 is supported by the frame body 140 covering the periphery and back surface of the display 14 with the touch panel 12. The frame body 140 is supported on the upper surface of the housing 28 (the information processing device 10) and is disposed so as to cover a portion of the upper surface of the housing 28. Specifically, the frame body 140 is supported by a substantially central portion in the front-back direction of the upper surface of the housing 28. In the present embodiment, the frame body 140 is supported by a rear end portion of the front upper cover 34.

Note that the frame body 140 is basically supported by the housing 28 such that the display surface of the display 14 slopes downward from the back side toward the front side. Hereinafter, a state where the display surface of the display 14 is an inclined surface (the first operating unit 60 is inclined) is referred to as a first state (basic state). In the first state, the display surface of the display 14 is an upper surface of the first operating unit 60, and thus the upper surface of the first operating unit 60 in the first state is an inclined surface sloping downward from the back side toward the front side.

Further, the inclination angle of the display surface of the display 14 in the first state with respect to the horizontal direction is substantially the same as the inclination angle of the upper surface of the housing 28 (the upper surface 36a of the rear upper cover 36) with respect to the horizontal direction. In other words, the display surface of the display 14 in the first state and the upper surface of the housing 28 are surfaces substantially parallel to each other. Furthermore, a front end portion of the display surface of the display 14 in the first state is separated from the upper surface 34a of the front upper cover 34 in the up-down direction. In other words, there is a step between the display surface of the display 14 in the first state and the upper surface 34a of the front upper cover 34.

Moreover, the frame body 140 is displaceably supported between the first state and a second state where the center of the first operating unit 60 (the center of the display 14 with the touch panel 12) is displaced forward from the first state. In other words, the first operating unit 60 is displaceable between the first state and the second state.

In the present embodiment, the frame body 140 is supported by a hinge (rotary support portion) 142 supporting the frame body 140 (the first operating unit 60) such that the frame body 140 (the first operating unit 60) is rotatable to the housing 28 about a lower end portion of the frame body 140. Specifically, the rotary support portion 142 includes a column-shaped or cylindrical shaft portion and a shaft support portion supporting the shaft portion such that the shaft portion is rotatable. The shaft portion is disposed on either one of the housing 28 and the frame body 140, and the shaft support portion is disposed on the other of the housing 28 and the frame body 140. A set of the shaft portion and the shaft support portion is disposed in each of left and right end portions of the lower end portion of the frame body 140. Further, the axis of the shaft portion extends in the left-right direction, and the rotary support portion 142 having the axis in the left-right direction supports the frame body 140 (the first operating unit 60) such that the frame body 140 (the first operating unit 60) is rotatable in the front-back direction and in the up-down direction. In addition, a portion in which the shaft portion and the shaft support portion make contact with (slide against) each other is overlapped with (covered by) a portion of the frame body 140 or a portion of the front upper cover 34 so as not to be seen from the outside. Therefore, dust does not easily enter the portion in which the shaft portion and the shaft support portion make contact with each other (the inside of the rotary support portion 142).

Further, the first operating unit 60 is not displaced in a direction in which the center of the first operating unit 60 shifts from the first state toward the back side (in a direction in which the inclination angle approaches the horizontal direction). As illustrated in FIG. 3, a protrusion 360 is disposed on the upper surface of the housing 28 (the upper surface 36a of the rear upper cover 36 in the present embodiment). An upper surface of the protrusion 360 is brought into contact with a lower surface of the first operating unit 60 (a lower surface or a back surface of the frame body 140), and thus the first operating unit 60 is restricted from rotating in the direction in which the inclination angle approaches the horizontal direction. As just described, a state where the first operating unit 60 is not displaced toward the back side (is in a non-displaceable condition) is the first state. In other words, a state where the first operating unit 60 is restricted from rotating by the protrusion 360 is the first state. Furthermore, the upper surface of the protrusion 360 is a curved surface bulged toward the upper side, and the protrusion 360 is formed in a semi-cylindrical shape (a shape forming a portion of a cylinder).

Moreover, a space (an opening) 66 coincided with the protrusion height of the protrusion 360 is formed between the lower surface of the first operating unit 60 in the first state and the upper surface of the housing 28. Since the protrusion 360 is arranged at predetermined intervals from front, rear, left, and right ends of the upper surface of the housing 28, the opening 66 is formed on the left side, the right side, and the back side on the lower surface of the first operating unit 60. In other words, the opening 66 is formed in all portions except a support portion (the rotary support portion 142) of the first operating unit 60. A user inserts his/her hand into the opening disposed on the left side, the right side, and the back side and holds (grabs) the first operating unit 60 and thereby can rotate the first operating unit 60. As just described, the opening 66 is formed on the back side of the first operating unit 60. Therefore, the operability at the time of displacing the first operating unit 60 can be increased, and the user's fingers can be prevented from getting stuck at the time of displacing the first operating unit 60.

In addition, the first operating unit 60 is displaceable (rotatable) in a direction in which the center of the first operating unit 60 shifts from the first state toward the front side (in a direction in which the inclination angle approaches the vertical direction). A state where the center of the first operating unit 60 is displaced from the first state toward the front side is the second state. A state where the center of the first operating unit 60 is displaced from the first state toward the front side and the display surface of the display 14 is a substantially vertical surface is illustrated as an example of the second state in FIGS. 4 and 5.

Note that the first operating unit 60 is manually rotated by a user in the present embodiment. The first operating unit 60 is rotated, and thus the inclination angle of the display surface of the display 14 is changed. Note that a restriction portion is provided, and the restriction portion restricts the center of the first operating unit 60 from rotating toward the front side (in the direction in which the inclination angle approaches the vertical direction) from the state where the display surface of the display 14 is a substantially vertical surface. The restriction portion allows the display surface of the display 14 to be a substantially vertical surface as described above.

Figure 5:
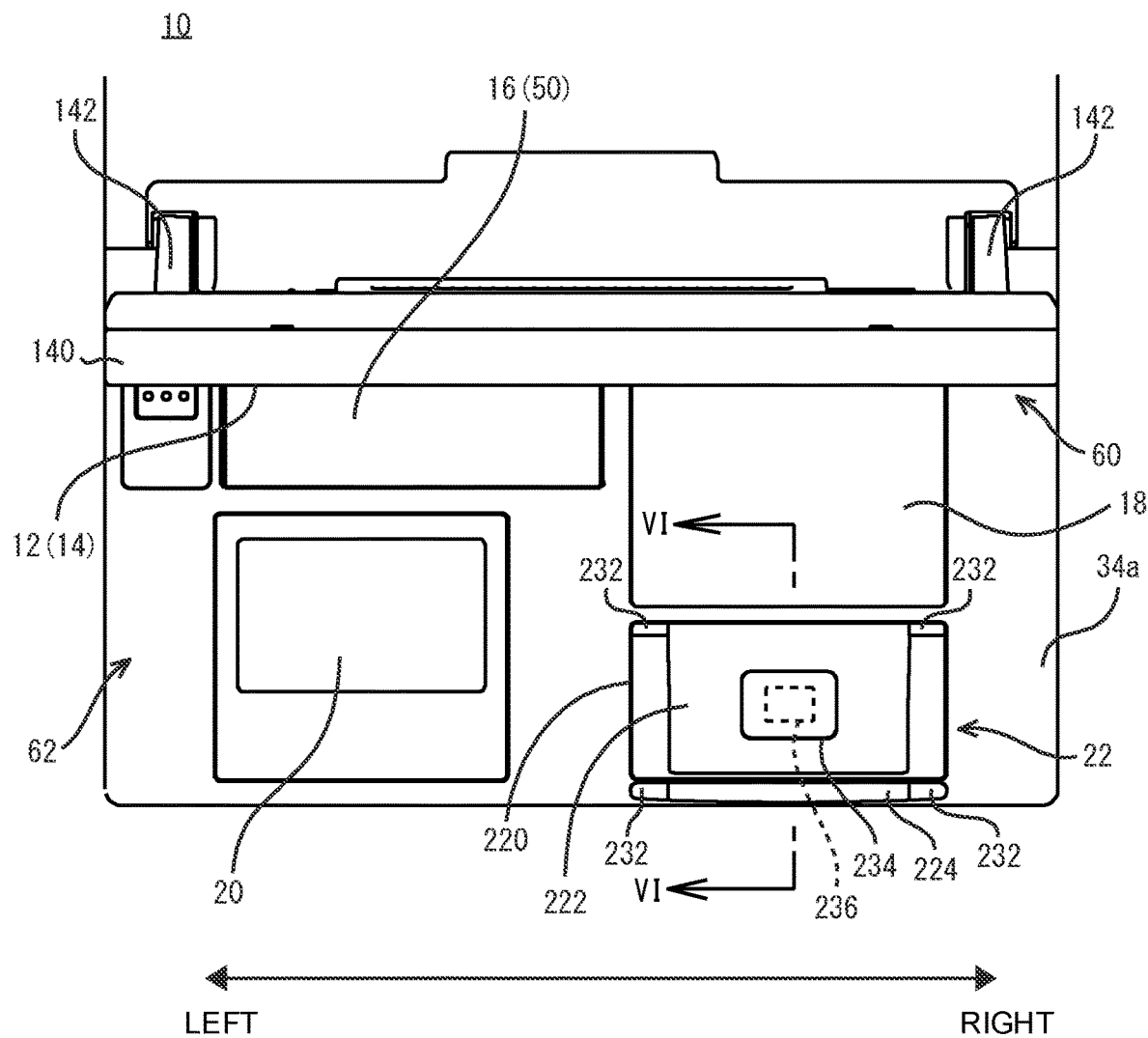
FIG. 5 is a plan view illustrating a configuration of an upper surface of the information processing device.

Next, the second operating unit 62 will be described. As illustrated in FIGS. 1, 2, and 5, the second operating unit 62 includes the plurality of operating components such as the memory connection 50, the paper strip printer 18, the code reader 20, and the near field communicator 22.

The memory connection 50 includes a mounting portion (memory slot) to which a portable non-volatile memory, which can be carried (for example, flash memories such as a USB memory, an SD memory card, and a memory stick) is to be mounted. The memory connection 50 includes a plurality of memory slots respectively corresponding to a plurality of types of flash memories.

The paper strip printer 18 (a third image forming unit) is, for example, a thermal printer (thermosensitive printer) or a dot impact printer. The paper strip printer 18 issues a piece of paper on which an image of a receipt, a journal, a coupon, or the like is printed. Specifically, the paper strip printer 18 prints various character strings, images, code patterns (bar- codes), or the like on a roll of paper and discharges a piece of printed paper from a paper ejection portion (paper ejection port) 18a.

The code reader 20 includes, for example, a laser scanner or a camera. The code reader 20 can read a code applied to a product, product packaging, a card, a receipt, or the like, or a code or the like displayed on a screen of a user terminal (mobile terminal). Codes that can be read by the code reader 20 include bar codes (one-dimensional bar codes) or two- dimensional codes (for example, a QR code (registered trademark), a Micro QR code, DataMatrix MaxiCode, Veri- Code, or the like).

The near field communicator 22 performs wireless non- contact data communication with a communication target in accordance with a communication standard such as ISO/IEC 18092 (so-called NFC (Near Field Communication)). For example, the near field communicator 22 performs wireless non-contact data communication with a portable communi- cation object such as an IC card, a mobile terminal (a feature phone, a smartphone, a tablet PC, or the like), an ID card, a membership card, or an employee ID card in accordance with a communication standard such as Felica (registered trademark). A communicable distance of the near field communicator 22 is a length about several centimeters to several meters. As illustrated in FIG. 5, the near field communicator 22 includes a placement section 220 on which a communication object is to be placed. In addition, the specific configuration of the placement section 220 will be described below.

The near field communicator 22 transmits, to the com- munication object placed on the placement section 220, a signal (reading command) instructing to read out data stored in a storage of the communication object. The communica- tion object sends the data as a response to the reading command to the near field communicator 22. Further, the near field communicator 22 transmits, to the storage of the communication object, a signal (writing command) instruct- ing writing together with data (writing data) to be written in the storage of the communication object. The writing data received is written (stored) in the storage of the communi- cation object in accordance with the writing command.

Furthermore, the communication object with which the near field communicator 22 performs data communication includes a so-called electronic money medium. The elec- tronic money medium is an IC card, a mobile terminal, or the like and is a medium including a storage that stores data (electronic money data) including at least data of the balance of electronic money (electronic money balance) and related to payment by electronic money (electronic payment). In a case where the near field communicator 22 performs data communication with the electronic money medium, the near field communicator 22 transmits, to the electronic money medium, a reading command instructing to read out the electronic money data stored in the electronic money medium. The electronic money medium sends the electronic money data as a response to the reading command to the near field communicator 22. In addition, the near field communicator 22 transmits a writing command instructing writing together with writing data to be written in the electronic money medium. The writing data received is stored in the storage of the electronic money medium in accordance with the writing command. As just described, the near field communicator 22 functions as an electronic money reader.

As illustrated in FIGS. 2 and 5, the operating components configuring the second operating unit 62 are disposed on the upper surface of the housing 28. The second operating unit 62 is arranged on the front side of the first operating unit 60. In other words, the first operating unit 60 is arranged on the back side of the second operating unit 62.

In the present embodiment, the operating components of the second operating unit 62 are disposed on the front upper cover 34. Specifically, the code reader 20 and the near field communicator 22 (the placement section 220) arranged side by side in the left-right direction on the front side of the second operating unit 62 (near side as seen from a user). The memory connection 50 is arranged side by side with the code reader 20 on the back side thereof. The paper strip printer 18 is arranged side by side with the near field communicator 22 (the placement section 220) on the back side thereof. Note that a portion of the paper strip printer 18 from which the paper ejection portion 18a disposed on a connection surface 42 is excluded, in particular, a portion of the paper strip printer 18, which is included in the second operating unit 62, has a flat surface. In addition, the operating components such as the memory connection 50 and the code reader 20 are not arranged on the back side of the near field communicator 22 (the placement section 220). Accordingly, protruded or recessed portions such as protrusions are not present on the back side of the near field communicator 22 (the placement section 220). Therefore, a communication object (for example, a smartphone, a tablet PC, or the like) larger than the placement section 220 can be held over (placed close to) the near field communicator 22.

In addition, the upper surface of the housing 28 (the upper surface 34a of the front upper cover 34) on which the operating components of the second operating unit 62 are disposed is an upper surface of the second operating unit 62. As described above, the upper surface of the housing 28 (the upper surface 34a of the front upper cover 34) is an inclined surface sloping downward from the back side toward the front side. Therefore, the upper surface of the second operating unit 62 is an inclined surface sloping downward from the back side toward the front side (with an inclination angle of 30 degrees with respect to the horizontal direction), and the upper surface of the second operating unit 62 is a surface substantially parallel to the upper surface of the first operating unit 60 in the first state (the display surface of the display 14 in the first state). Placing a drink container or the like on an inclined surface seems more difficult than placing a drink container or the like on a horizontal surface. Thus, a drink container or the like that may cause a failure of electronic components built in the housing 28 can be prevented from being placed on the upper surface of the second operating unit 62.

Further, the operating components of the second operating unit 62 are disposed on the inclined surface (the upper surface of the second operating unit 62); therefore, advantageously, even a user, the eye level of which is low or even a user, the eye level of which is high can visually recognize the operating components and easily operate the operating components. In other words, the visual recognition and operability of various users having different physical characteristics can be improved.

Furthermore, guidance information such as character strings, figures, and symbols for guiding or instructing a user is indicated on the upper surface of the second operating unit 62. The guidance information is desirably indicated on the upper surface of the second operating unit by silk printing. With such a configuration, regardless of the eye level of a user, the guidance information is likely to be visually recognized, and thus the visibility of the guidance information can be improved.

Next, the third operating unit 64 will be described. As illustrated in FIGS. 2 to 4, the third operating unit 64 includes the optical disk connection (optical drive) 52 and the paper ejection portion 18a of the paper strip printer 18. The optical disk connection 52 includes a disk drive into which an optical disk (for example, CD-R, DVD-R and BD-R disks) is to be placed. For example, the optical disk connection 52 is used at the time of printing an image stored in the optical disk. In addition, the memory connection 50 and the optical disk connection 52 which are described above can be collectively referred to as a storage medium connection 16 to which various storage media are to be connected.

The third operating unit 64 is disposed on the connection surface (connection) 42 formed between a front end portion of the upper surface of the first operating unit 60 (the display surface of the display 14 in the first state) and a rear end portion of the upper surface of the second operating unit 62. In other words, the third operating unit 64 is arranged between the first operating unit 60 and the second operating unit 62. Additionally, in the present embodiment, the connection surface 42 is a front surface (for example, a substantially vertical surface) of a vertical wall portion formed at the rear end portion of the front upper cover 34. As just described, the third operating unit 64 is arranged on the front surface of the vertical wall portion between the first operating unit 60 and the second operating unit 62. Therefore, in addition to easy visual recognition by a user, a space between the first operating unit 60 and the second operating unit 62 can be effectively utilized. Moreover, the first operating unit 60, the second operating unit 62, and the third operating unit 64 are arranged in the most part of the upper surface of the housing 28, and thus a space in the upper surface of the housing 28 can be effectively utilized without waste.

Returning to FIG. 1, the money processing unit 24 includes a money insertion portion 24a and a coin return slot 24b. The money insertion portion 24a includes a coin insertion slot 24c for inserting coins, a bill insertion slot 24d for inserting bills, a change return lever 24e for returning change, or the like.

The coins inserted from the coin insertion slot 24c and the bills inserted from the bill insertion slot 24d are classified according to the type of money to be stored in a money storage (not illustrated) built in the front cover 30. The money storage includes a coin storage and a bill storage. When coins or bills are inserted, the amount of money inserted is calculated according to the type and number of coins stored in the coin storage and the type and number of bills stored in the bill storage. When a predetermined service or the like is executed in the information processing device 10, the cost according to the content of the service or the like (charge related to the provision of the service or the like) is deducted from the amount of money inserted, and the remaining amount (amount of balance) after the charge is deducted from the amount of money inserted is calculated. Further, when the change return lever 24e is operated, coins or bills are returned based on the amount of balance. Note that coins are returned from the coin return slot 24b and that bills are returned from the bill insertion slot 24d.

Note that electronic payment may be made in place of or in addition to the payment with money at the money processing unit 24. For example, after a service or the like is selected, a plurality of electronic money brands (types) are displayed on the display 14 of the information processing device 10, and a user is allowed to select electronic money for payment. Then, the electronic money for payment is used to settle the payment, and when the payment is completed, the service or the like is provided.

The aforementioned money storage is built in the front cover 30. The money insertion portion 24a and the coin return slot 24b are disposed on the front surface of the front cover 30 (the housing 28). For example, the money insertion portion 24a is arranged at the upper end portion of the front cover 30. Meanwhile, the coin return slot 24b is located below the money insertion portion 24a and is arranged at a predetermined interval with respect to the money insertion portion 24a.

Moreover, portions of the coin return slot 24b, the coin insertion slot 24c, and the bill insertion slot 24d or predetermined locations near the coin return slot 24b, the coin insertion slot 24c, and the bill insertion slot 24d are colored in a predetermined color (first color). In the present embodiment, a label 24f attached above the coin return slot 24b, a substantially circular frame line 24g surrounding the coin insertion slot 24c, and a label 24h attached above the bill insertion slot 24d are colored in the first color (for example, yellow). Note that locations other than the label 24f, the frame line 24g, and the label 24h on the front surface of the front cover 30 (the housing 28) are not colored in the first color. Therefore, only portions of the coin return slot 24b, the coin insertion slot 24c, and the bill insertion slot 24d or predetermined locations near the coin return slot 24b, the coin insertion slot 24c, and the bill insertion slot 24d are colored in the first color. Consequently, a user can intuitively recognize that the coin return slot 24b, the coin insertion slot 24c, and the bill insertion slot 24d are related to each other (related to the payment with money).

The photo printer 26 (a second image forming unit) is, for example, a dye sublimation printer or an ink-jet printer (in particular, an ink-jet printer using a dye ink). An image is printed on photographic paper (photo paper, for example, glossy paper) or label seal paper (hereinafter, referred to simply as seal paper). A photo printed by the photo printer 26 is discharged to a photo ejection portion 26a. Seal paper is structured such that an adhesive layer coated with an adhesive (glue) is formed on the back surface of the surface (printing surface) on which an image is printed and such that release paper (mounting paper or backing paper) that can be easily peeled off is adhered to the back surface.

Note that image data stored in a storage medium connected to the storage medium connection 16, image data transmitted from an external computer such as a server, or the like is utilized as image data for forming an image on the photo paper or the seal paper in the photo printer 26. Further, the size of the photo paper or the like is L size, 2 L size, or the like.

The photo printer 26 is built in the front cover 30. The photo ejection portion 26a is disposed on the front surface of the front cover 30 (the housing 28). Note that the photo ejection portion 26a is arranged side by side with the coin return slot 24b in the left-right direction. In other words, the photo ejection portion 26a and the coin return slot 24b are arranged substantially on the same level. In addition, since the money insertion portion 24a, the coin return slot 24b, and the photo ejection portion 26a are disposed on the front surface of the front cover 30 (the housing 28), the money insertion portion 24a, the coin return slot 24b, and the photo ejection portion 26a are not included in any of the first operating unit 60, the second operating unit 62, and the third operating unit 64 which are described above. The money insertion portion 24a, the coin return slot 24b, and the photo ejection portion 26a can be collectively referred to as a fourth operating unit.

Next, the placement section 220 of the near field communicator 22 will be described with reference to FIGS. 5 and 6. The placement section 220 is disposed on the upper surface of the housing 28 (the upper surface 34a of the front upper cover 34), and includes a placement surface 222 and a first protrusion 224.

The placement surface 222 is configured by a portion of the upper surface of the housing 28 (the upper surface 34a of the front upper cover 34). In other words, the placement surface 222 is an inclined surface sloping downward from the back side toward the front side. In addition, the placement surface 222 is formed in a substantially rectangular shape coincided with the shape (a rectangular shape specified by JISX6301 or ISO/IEC7810) and size (length 53.98 mm×wide 85.60 mm) of an IC card of a communication object. In addition, the size of the placement surface 222 is set to be the same as the communication object or slightly larger than the communication object. Further, the placement section 220 as a whole is formed in a substantially rectangular shape slightly larger than the placement surface 222.

Furthermore, the first protrusion 224 extends along a lower edge of the placement section 220 (a lower edge of the placement surface 222) in the left-right direction and protrudes upward (substantially perpendicular to the upper surface of the housing 28). In the present embodiment, the first protrusion 224 is formed from a left end portion to a right end portion of the placement section 220, that is, so as to face the entire placement section 220 in the left-right direction. Moreover, the first protrusion 224 may be formed so as to face a portion (for example, only the center portion) of the placement section 220 in the left-right direction.

As just described, the first protrusion 224 is disposed along the lower edge of the placement section 220, and thus a communication object can be prevented from slipping from the placement section 220 (the placement surface 222) (the movement of the communication object is inhibited).

Figure 6:
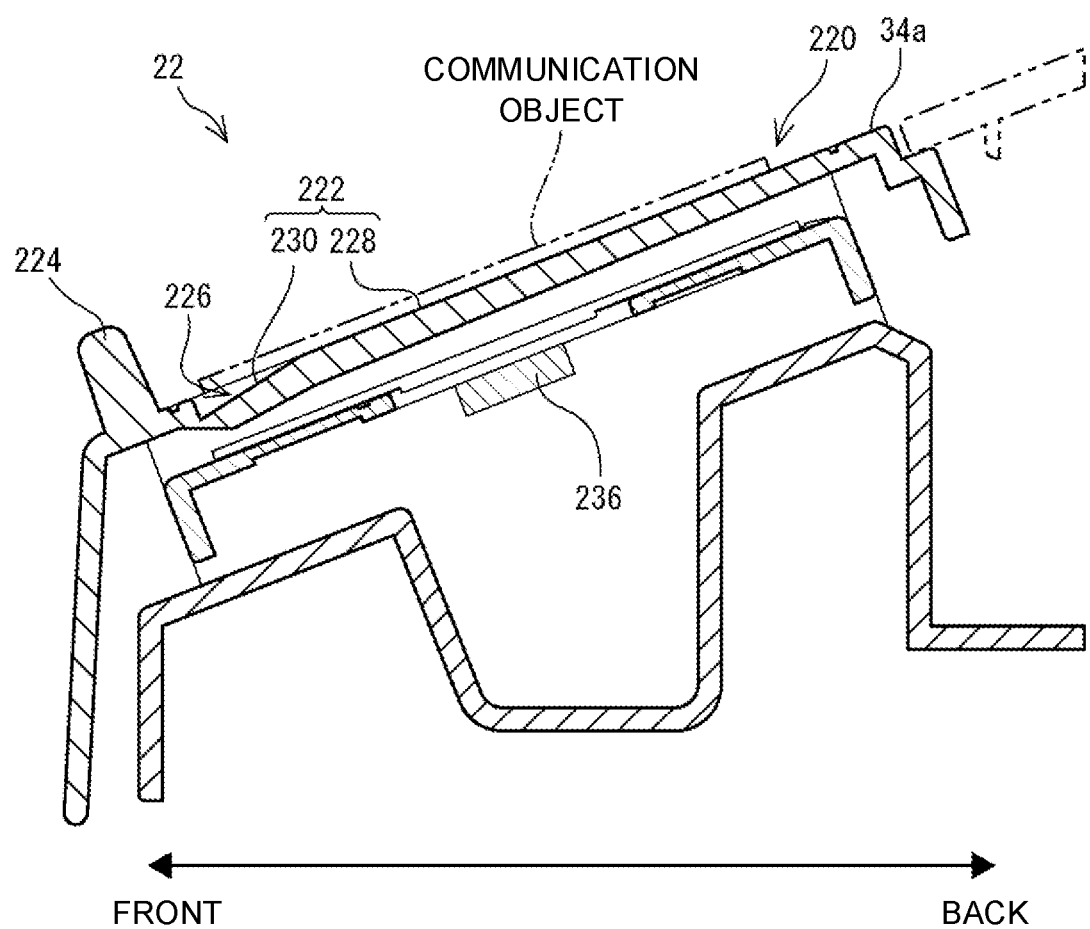
FIG. 6 is a cross-sectional view illustrating a configuration of a near field communicator.

Further, as illustrated in FIG. 6, a step is formed at a lower end portion of the placement surface 222. In the present embodiment, the step is formed by a recess 226 disposed in the lower end portion of the placement surface 222 and extending in the left-right direction. The step (recess 226) is disposed substantially entirely along the left-right direction of the lower end portion of the placement surface 222. Specifically, the placement surface 222 includes a first inclined surface 228 being the same surface (having the same inclination angle) as the upper surface of the housing 28, and a second inclined surface 230 connected a lower side (front side) of the first inclined surface 228 at the lower end portion of the placement surface 222 and sloping downward from the first inclined surface 228 toward the front side (having a larger inclination angle with respect to the horizontal direction than that of the first inclined surface 228). The recess 226 is formed by a difference between the inclination angles of the first inclined surface 228 and the second inclined surface 230. In other words, the second inclined surface 230 forms the recess 226.

As just described, the step is formed at the lower end portion of the placement surface 222; therefore, when a communication object such as an IC card is placed on the placement surface 222, a gap (space) is formed at the lower end portion of the placement surface 222 (a lower end portion of the communication object) between the communication object and the placement surface 222. Consequently, when the lower end portion of the communication object is pushed from above by a user, the opposite side (an upper end portion of the communication object) rises. As a result, even when the first protrusion 224 is present, the communication object can be easily taken out from the placement surface 222.

Further, returning to FIG. 5, the placement section 220 includes a plurality of light emitters 232. Each of the plurality of light emitters 232 includes a light source such as an LED lamp. The light emitters 232 are arranged side by side at the outer side of the placement surface 222. In other words, each of the plurality of light emitters 232 is arranged at a location not overlapped with an IC card (length 53.98 mm×wide 85.60 mm) when the IC card is placed on the placement surface 222. In the present embodiment, the light emitters 232 are disposed respectively on four corner portions of the placement section 220 in the up-down direction and the left-right direction (four corners of the placement section 220). Furthermore, two of the four light emitters 232, which are arranged at the lower side are disposed on the first protrusion 224. Specifically, the two light emitters 232 arranged at the lower side are disposed respectively at opposite end portions of the first protrusion 224 in the left-right direction (longitudinal direction).

For example, the light emitters 232 are turned on when electronic payment is selected as a payment method of a fee, and attract a user's attention (guide a user) to the placement section 220 (the placement surface 222). In addition, the light emitters 232 are turned on when the near field communicator 22 and a communication object (for example, an electronic money medium) are in communication or when the communication of the near field communicator 22 with the communication object (for example, reading of electronic money data) is completed. Moreover, a predetermined time elapses from the timing when the light emitters has blinked, when the communication object is taken out (removed) from the placement section 220, or when another operating component (for example, the touch panel 12) is operated, the light emitters 232 are turned off. Therefore, a user can determine (recognize) a communication state (communication status) of the near field communicator 22 with the communication object in accordance with a blinking state of the light emitters 232.

As just described, since the light emitters 232 are disposed on the placement section 220, the area (the placement surface 222) on which a card is placed is suggested (indicated), and thus a user can be guided. Further, since the light emitters 232 are arranged side by side at the outer side of the placement surface 222, the light emitters 232 are not covered (hidden) by a communication object (an IC card) placed on or held over the placement section 220. Consequently, a user can easily determine (recognize) whether the communication object is being read (in communication) or whether reading of the communication object is completed (communication is completed).

Furthermore, when the light emitters 232 are disposed at a location not overlapped with the IC card or when the near field communicator 22 is in communication with the communication object, the light emitters 232 blink. Therefore, a user can easily determine that the near field communicator 22 is in communication with the communication object, and the communication object is prevented from being taken out by mistake during communication.

In addition, a wireless communication mark 234 serving as an index of the position where a communication object is held (positioned close) and including appropriate figures is disposed in the center of the placement surface 222. Moreover, a wireless communication antenna 236 for the near field communicator 22 to transmit/receive a signal to/from a communication object is built at a location corresponding to the wireless communication mark 234 in the housing 28. The wireless communication mark 234 and the wireless communication antenna 236 are arranged at the intersection of diagonal lines of the four corner portions of the placement section 220 in the up-down direction and the left-right direction (lines connecting the light emitters 232 diagonally arranged).

Figure 7:
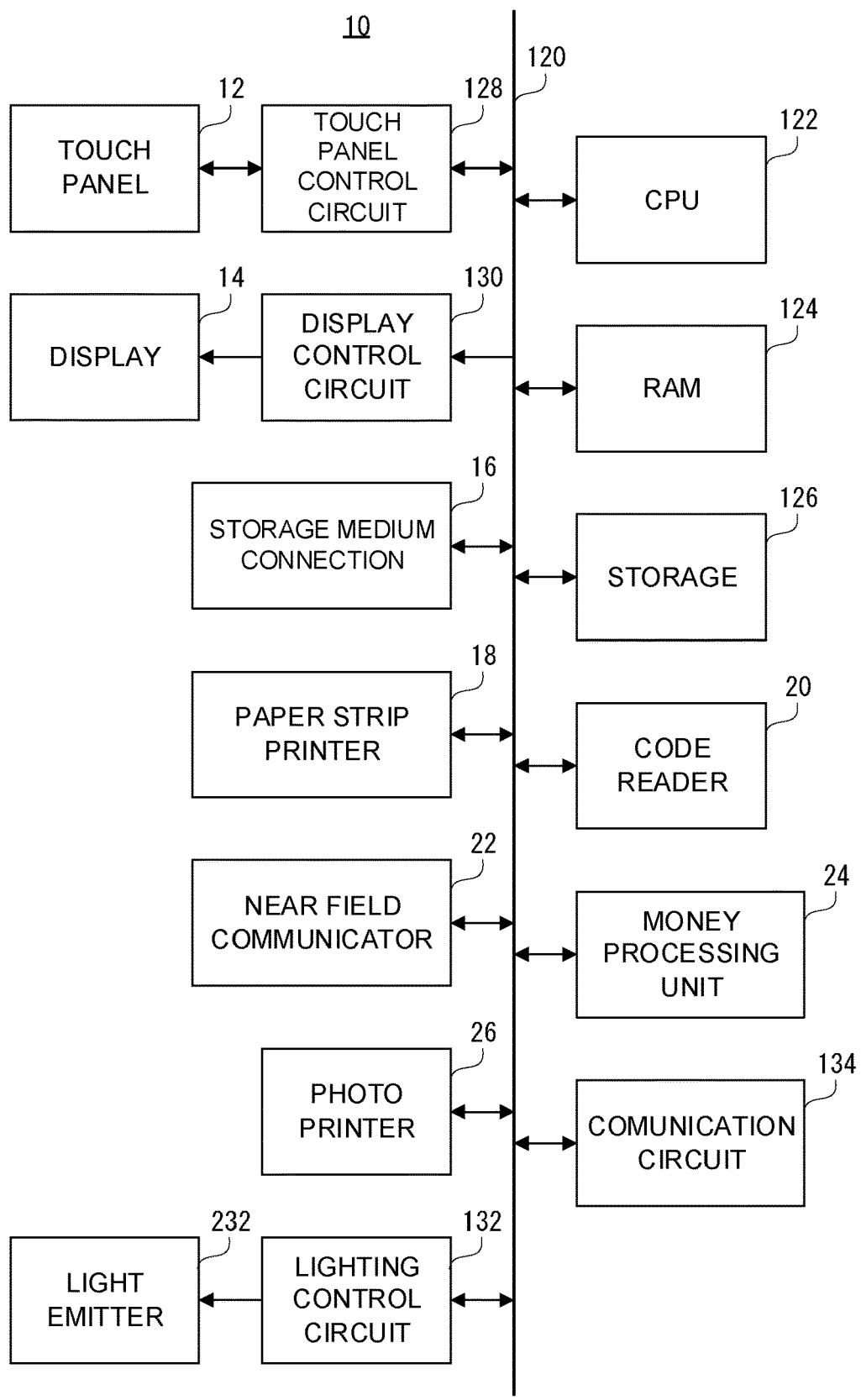
FIG. 7 is a block diagram illustrating an electrical configuration of the information processing device illustrated in FIG. 1.

FIG. 7 is a block diagram illustrating an electrical configuration of the information processing device 10 illustrated in FIG. 1. With reference to FIG. 7, the information processing device 10 includes a CPU 122. A RAM 124, a storage 126, a touch panel control circuit 128, a display control circuit 130, the storage medium connection 16, the paper strip printer 18, the code reader 20, the near field communicator 22, the money processing unit 24, the photo printer 26, a lighting control circuit 132, and a communication circuit 134 via a bus 120 to the CPU 122. Further, the touch panel 12 is connected to the touch panel control circuit 128. The display 14 is connected to the display control circuit 130. The light emitters 232 are connected to the lighting control circuit 132.

The CPU 122 manages the overall control of the information processing device 10. The RAM 124 is used as a work area and a buffer area of the CPU 122.

The storage 126 is a main storage device, including a ROM, an HDD, or the like, of the information processing device 10. The storage 126 stores a control program for the CPU 122 to control operations of components of the information processing device 10, default values for various information, display image data for various screens, or the like as appropriate. Note that instead of the HDD or together with the HDD, another non-volatile memory such as an SDD, a flash memory, and an EEPROM may be utilized as the storage 126. This also applies to a storage 86 of the image forming device 70 described below.

In addition, in the present embodiment, the CPU 122, the RAM 124, and the storage 126 function as a main controller of the image forming system 100. In other words, the information processing device 10 including the main controller functions as a main control device (master device) of the image forming system 100. Moreover, the CPU 122, the RAM 124, and the storage 126 are housed in the upper housing 32.

The touch panel control circuit 128 applies the required voltage to the touch panel 12, detects a touch operation (touch input) within a touch effective area of the touch panel 12, and outputs touch coordinate data indicating the position of the touch input to the CPU 122.

The display control circuit 130 includes a GPU, a VRAM, or the like. Under an instruction of the CPU 122, the GPU uses image generation data stored in the RAM 124, generates display image data in the VRAM for displaying various screens on the display 14, and outputs the generated display image data to the display 14.

The lighting control circuit 132 controls the light sources included in the light emitters 232 to allow the light sources to turn on or off. In addition, the light sources included in the light emitters 232 can be individually controlled. In other words, the light emitters 232 can be individually controlled. For example, lighting on/off is controlled in accordance with a communication state of the near field communicator 22 with a communication object.

The communication circuit 134 is a communication circuit to connect to a network such as an Internet. The communication circuit 134 is a wired communication circuit or a wireless communication circuit, and communicates through the network with the image forming device 70 and an external computer (external terminal) such as a server in accordance with an instruction from the CPU 122. Note that the communication circuit 134 can be directly communicate with the image forming device 70, the external terminal, or the like by a wired or wireless system (for example, an infrared method), a WiFi (registered trademark) method, or a Bluetooth (registered trademark) method not through the network.

In addition, the electric configuration of the information processing device 10 illustrated in FIG. 7 is merely an example and is not necessarily limited thereto. For example, the information processing device 10 may include, as another input means, a hardware operation button such as an operation panel. Alternatively, a hardware keyboard may be connected to the information processing device 10.

Returning to FIG. 1, the image forming device (corresponding to a first image forming device) 70 is a multifunction peripheral (MFP) including a printing function (print), a copying function, a scanner function, a facsimile function, or the like. Note that the image forming device 70 is arranged near the information processing device 10. In the present embodiment, the image forming device 70 is arranged adjacent to the information processing device 10 on the right side thereof.

The image forming device 70 includes a housing 80. The housing 80 includes a lower housing 80*a* and an upper housing 80*b* disposed on (connected to) an upper surface of the lower housing 80*a*. An image forming unit 74 and a paper feeder 76 are disposed in the lower housing 80*a*. An image reader 72 and a paper ejection tray 78 are disposed in the upper housing 80*b*.

The image reader 72 includes a document placement table formed of a transparent material, and is built in the upper housing 80*b* (the housing 80). A document holding cover 72*a* is attached via a hinge or the like above the document placement table so as to open and close.

Further, the image reader 72 includes a light source, a plurality mirrors, an imaging lens, a line sensor, or the like. The image reader 72 allows a surface of a document to be exposed to light by the light source and guides reflected light reflected from the surface of the document, through the plurality of mirrors to the imaging lens. Then, an image is formed from the reflected light by the imaging lens on a light receiving element of the line sensor. The line sensor detects brightness or chromaticity of the reflected light from which the image is formed on the light receiving element and generates read image data based on an image on the surface of the document. A charge coupled device (CCD), a contact image sensor (CIS), or the like is applied as the line sensor.

The image forming unit 74 (a first image forming unit) is built in the lower housing 80*a* (the housing 80). The image forming unit 74 is an electrographic image forming unit including a photoconductor drum, a charging device, an exposure device, a developing device, a transfer device, a fixing device, or the like. In addition, the image forming unit 74 includes a color printing function. A plurality of image forming stations including a photoconductor drum, a charging device, an exposure device, a developing device, or the like for each of colors of Y (yellow), M (magenta), C (cyan), and K (black) is disposed in the image forming unit 74. For example, the image forming unit 74 forms, by an electrographic method, an image on a predetermined recording medium (paper) fed from the paper feeder 76 or the like and discharges the paper on which the image is formed to the paper ejection tray 78 disposed between the image reader 72 and the image forming unit 74.

Note that the read image data read by the image reader 72, the image data transmitted from the information processing device 10, the image data transmitted from an external computer, or the like is utilized as the read image data for forming an image on the paper by the image forming unit 74.

In addition, the image forming unit 74 is not limited to an electrographic image forming unit. For example, the image forming unit 74 may be an ink-jet image forming unit.

Note that the dimension (size) in the up-down direction of the lower housing 80*a* is substantially equal to the dimension in the up-down direction of the front cover 30 of the information processing device 10 and that the lower housing 80*a* and the front cover 30 are arranged substantially at the same position in the up-down direction. Therefore, an upper edge of the lower housing 80*a* is located substantially on the same level as an upper edge of the front cover 30 of the information processing device 10, and a lower edge of the lower housing 80*a* is located substantially on the same level as an lower edge of the front cover 30 of the information processing device 10. In other words, the heights of the upper edge and the lower edge of the lower housing 80*a* coincide with the heights of the upper edge and the lower edge of the front cover 30 (the width in the up-down direction of the lower housing 80*a* coincides with the width in the up-down direction of the front cover 30).

Further, the width (size) in the up-down direction of the upper housing 80*b* is substantially equal to the width in the up-down direction from a lower end portion of the front upper cover 34 to an upper end portion of the frame body 140 in the first state. An upper edge of the upper housing 80*b* is located substantially on the same level as an upper edge of the frame body 140 in the first state, and a lower edge of the upper housing 80*b* is located substantially on the same level as a lower edge of the front upper cover 34.

In other words, the position (height) in the up-down direction of a boundary line between the front cover 30 and the front upper cover 34 in the information processing device 10 coincides with the height of a boundary line between the lower housing 80*a* and the upper housing 80*b* in the image forming device 70. The height of an upper end of the information processing device 10 (the upper edge of the frame body 140 in the first state) coincides with the height of an upper end of the image forming device 70 (the upper edge of the upper housing 80*b*).

Furthermore, the most part of the front cover 30 (excluding the portion colored in the first color described above) is colored in a second color (for example, light gray), and the lower housing 80*a* is also colored in the second color or a similar color to the second color. Note that similar colors mean colors adjacent to a target color in the color wheel.

Moreover, the front upper cover 34 and the frame body 140 are colored in a third color (for example, black or dark gray) different from the first color and the second color, and the upper housing 80*b* is also colored in the third color or a similar color to the third color.

Therefore, in the information processing device 10 and the image forming device 70, respectively, from the boundary with the border line between the front cover 30 and the front upper cover 34 and the boundary with the border line between the lower housing 80*a* and the upper housing 80*b*, the lower side is colored in the second color and the upper side is colored in the third color different from the second color. Consequently, although the information processing device 10 and the image forming device 70 are separate devices, a sense of unity is generated, and thus the aesthetic appearance of the image forming system 100 is improved. Further, components such as the first operating unit 60, the document placement table, and the paper ejection tray 78 that are likely to be used by users are all located above the aforementioned border line. Therefore, the flow of user operations from the first operating unit 60 to the document mounting tray, from the first operating unit 60 to the paper ejection tray 78, or the like can be guided.

Furthermore, the front side and the left side (side adjacent to the information processing device 10) of the paper ejection tray 78 are opened, and the bottom surface of the paper ejection tray 78 includes an inclined surface sloping upward toward the information processing device 10 (sloping downward toward the opposite side of the information processing device 10). Moreover, a wall portion 80c that is a portion of the upper housing 80b is disposed on the back side of the paper ejection tray 78. In other words, the paper ejection tray 78 is defined by the wall portion 80c. Note that an end portion (a left end portion) of the wall portion 80c, which is located adjacent to the information processing device 10 is disposed at a predetermined interval from a side surface of the information processing device 10 (the housing 28). Therefore, a lighting opening 92 is formed between the information processing device 10 and the wall portion 80c. Natural light or light of the illumination in an installation site of the information processing device 10 enters the paper ejection tray 78 through the lighting opening 92; therefore, the inside of the paper ejection tray 78 becomes bright, and the visibility of the paper ejection tray 78 is improved.

Figure 8:
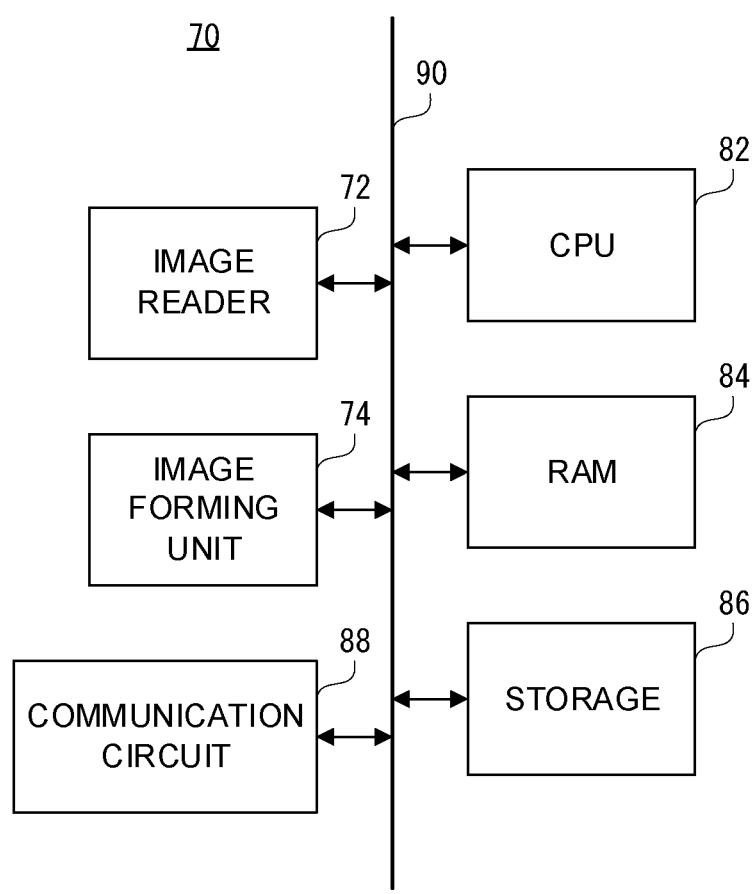
FIG. 8 is a block diagram illustrating an electrical configuration of an image forming device illustrated in FIG. 1.

FIG. 8 is a block diagram illustrating an electrical configuration of the image forming device 70 illustrated in FIG. 1. With reference to FIG. 8, the image forming device 70 includes a CPU 82. A RAM 84, the storage 86, the image reader 72, the image forming unit 74, and a communication circuit 88 are connected via a bus 90 to the CPU 82.

The CPU 82 manages the overall control of the image forming device 70. The RAM 84 is as a work area and a buffer area of the CPU 82.

The storage 86 is a main storage device such as an HDD of the image forming device 70. The CPU 82 stores a control program for controlling operations of portions of the image forming device 70, display image data for various screens, or the like as appropriate. In addition, in the present embodiment, the CPU 82, the RAM 84, and the storage 86 function as sub-control units of the image forming system 100.

The communication circuit 88 is a communication circuit to connect to a network such as an Internet. The communication circuit 88 is a wired communication circuit or a wireless communication circuit, and communicates through the network with an external computer such as a server in accordance with an instruction from the CPU 82. Note that the communication circuit 88 can directly communicate with the information processing device 10 by a wired or wireless system not through the network.

In addition, the electric configuration of the image forming device 70 in FIG. 8 is merely an example and is not necessarily limited thereto.

According to the information processing device 10 of the first embodiment, the display surface of the display 14 configuring the first operating unit 60 and the upper surface of the second operating unit 62 including a plurality of operating components are inclined surfaces inclined in the same direction. Therefore, advantageously, even a user, the eye level of which is low or even a user, the eye level of which is high can visually recognize the operating components and easily operate the operating components.

Figure 9:
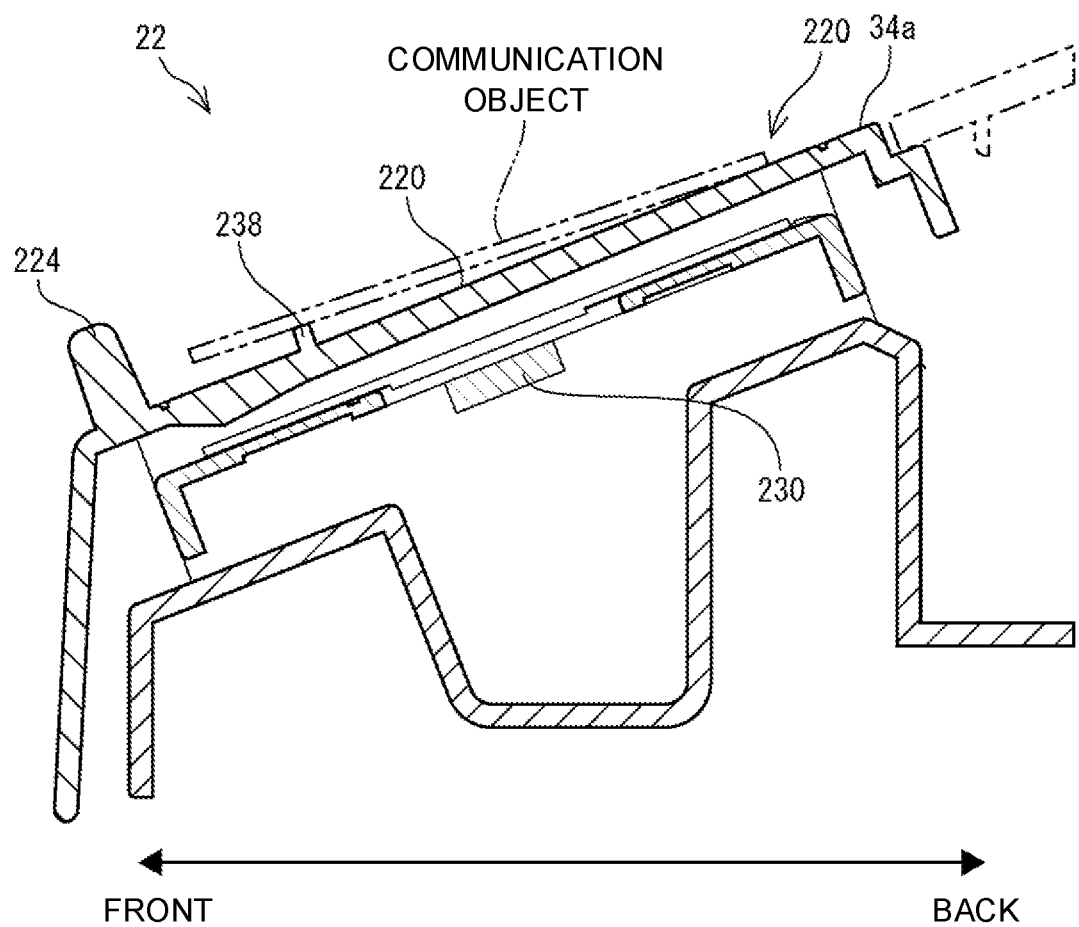
FIG. 9 is a cross-sectional view illustrating a configuration of the near field communicator in a modified example.

In addition, in the aforementioned first embodiment, the step is formed by the recess 226 disposed in the lower end portion of the placement surface 222, but not necessarily limited thereto. For example, as illustrated in FIG. 9, a step may be formed by a second protrusion 238 extending in the left-right at the lower end portion of the placement surface 222. The second protrusion 238 may be disposed substantially entirely along the left-right direction on the placement surface 222 or may be partially disposed in a portion (for example, the center) in the left-right direction of the placement surface 222. The second protrusion 238 protrudes in the same direction as the first protrusion 224 (upward or perpendicularly to the upper surface of the housing 28), and in the meanwhile, the position of an upper end of the second protrusion 238 is located below the position of an upper end of the first protrusion 224 (close to the upper surface of the housing 28). In other words, the protrusion amount of the second protrusion 238 is smaller than that of the first protrusion 224 (the protrusion height of the second protrusion is lower). Specifically, the position of the upper end of the second protrusion 238 (the protrusion height of the second protrusion 238) is set such that when a communication object is placed on the placement surface 222, a lower end portion of the communication object does not get over the first protrusion 224 (is not located above the first protrusion 224).

Second Embodiment

A second embodiment of the present invention is the same as the first embodiment except that instead of the rotary support portion 142, slide support portions 44 are disposed on the information processing device 10; therefore, the contents different from those of the first embodiment will be described, and duplicate explanations will be omitted.

Figure 10:
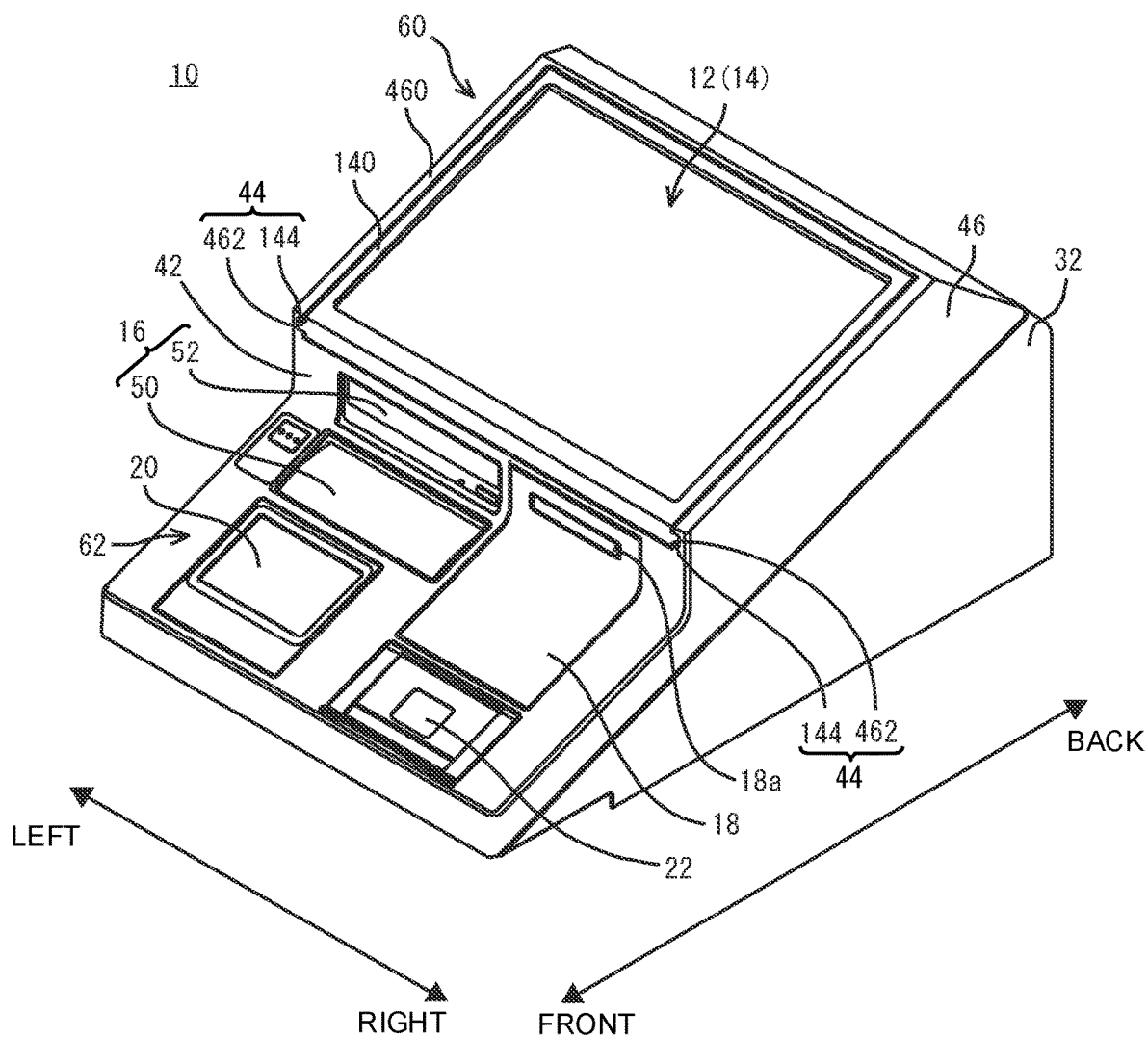
FIG. 10 is a perspective view illustrating an external configuration of the information processing device in the first state in a second embodiment of the present invention.
Figure 11:
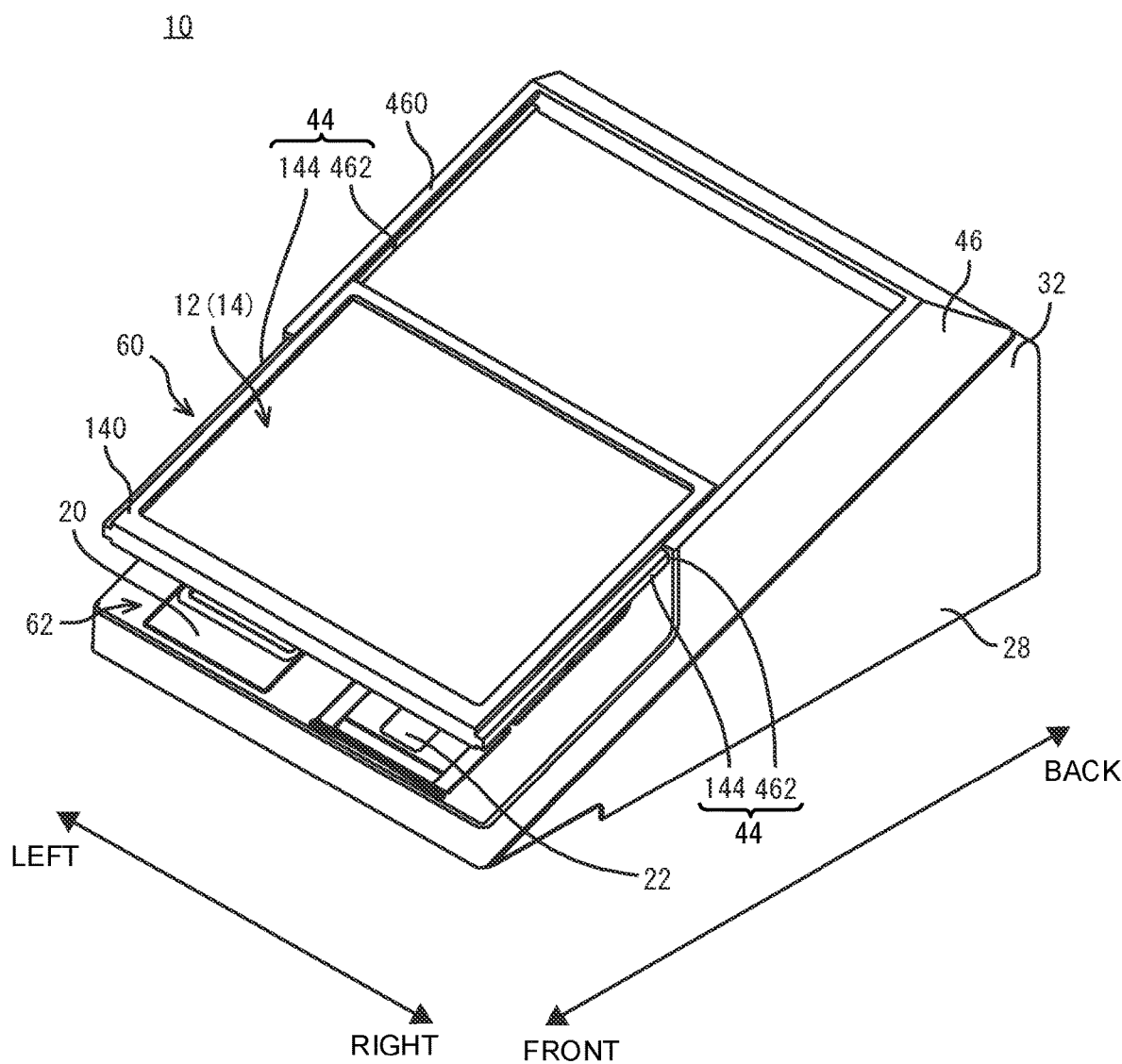
FIG. 11 is a perspective view illustrating an external configuration of the information processing device in the second state in the second embodiment.

As illustrated in FIGS. 10 and 11, in the second embodiment, instead of the front upper cover 34 and the rear upper cover 36, the housing 28 includes an upper cover 46 that configures the most part of the upper end portion (the upper surface) of the housing 28.

Further, the frame body 140 is supported by the slide support portions 44 that support the frame body 140 (the first operating unit 60) such that the frame body 140 (the first operating unit 60) is slidable to the housing 28 along the upper surface of the first operating unit 60 in the front-back direction. In other words, the first operating unit 60 is slid along the upper surface of the first operating unit 60, therefore being displaced in the front-back direction while maintaining the inclination angle.

The slide support portions 44 are disposed along left and right end portions of the frame body 140, and each of the slide support portions 44 includes a guide groove 462 and a guide protrusion 144 which are slidably fitted. In the present embodiment, the guide groove 462 is formed in the housing 28 (the upper cover 46), and the guide protrusion 144 is formed at the frame body 140. Alternatively, the guide groove 462 may be formed in the frame body 140, and the guide protrusion 144 may be formed at the housing 28 (the upper cover 46).

In the second embodiment, as illustrated in FIG. 10, a state where the frame body 140 (the first operating unit 60) is located on the rearmost side (a rear end portion of the frame body 140 is in contact with a vertical wall of the upper cover 46, which is located on the back side) is the first state. As illustrated in FIG. 11, a state where the frame body 140 (the first operating unit 60) is displaced to the front side is the second state.

According to the second embodiment, the upper surface of the first operating unit 60 and the upper surface of the second operating unit 62 are inclined in the same direction in the same way as in the first embodiment; therefore, the operability of a user can be improved.

Further, in addition to the configuration of the second embodiment described above, a position detection sensor that detects the position of the frame body 140 (the first operating unit 60) may be disposed in the information processing device 10. With such a configuration, in a case where the first operating unit 60 is in the second state at the timing when operating components of the second operating unit 62 need to be operated (in a case where a portion of the second operating unit 62 is covered by the first operating unit 60), a notification screen to suggest sliding the first operating unit 60 rearward is displayed on the display 14. Thus, a user can be urged to slide the first operating unit 60 rearward and bring the first operating unit 60 into the first state (allow the upper side of the second operating unit 62 to be opened). In addition, a drive mechanism for moving the frame body 140 (the first operating unit 60) may be disposed in the information processing device 10. With such a configuration, the first operating unit 60 can be automatically brought into the first state at the timing when operating components of the second operating unit 62 need to be operated.

Third Embodiment

A third embodiment of the present invention is the same as the first embodiment except that the front-back relation between the first operating unit 60 and the second operating unit 62 is reversed; therefore, the contents different from those of the first embodiment will be described, and duplicate explanations will be omitted.

Figure 12:
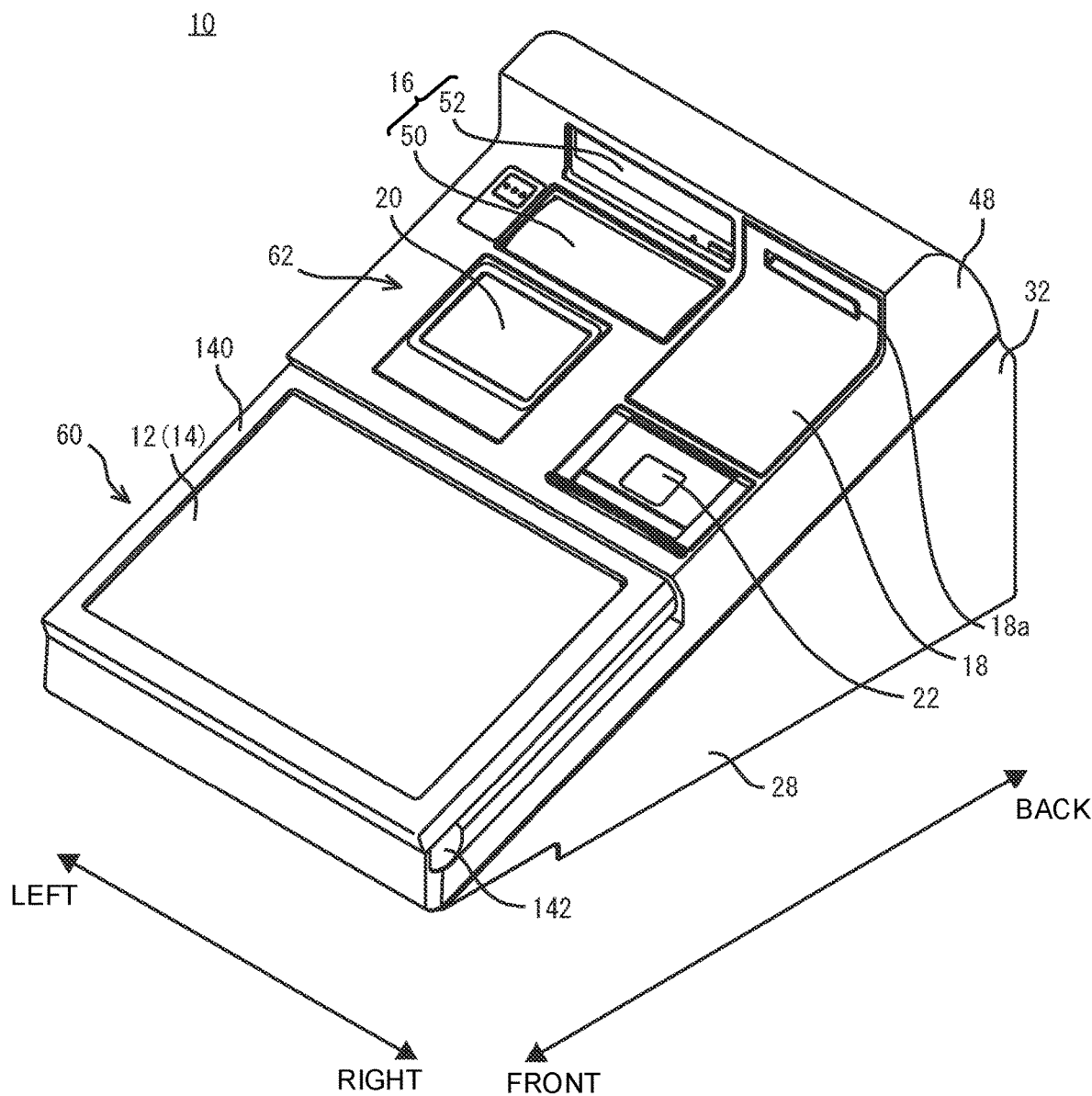
FIG. 12 is a perspective view illustrating an external configuration of the information processing device according to a third embodiment of the present invention.

As illustrated in FIG. 12, in the third embodiment, instead of the front upper cover 34 and the rear upper cover 36, the housing 28 includes an upper cover 48 that configures the most part of the upper end portion (the upper surface) of the housing 28. Further, the second operating unit 62 is arranged on the back side of the first operating unit 60 on the upper surface of the housing 28. In other words, the first operating unit 60 is arranged on the front side of the second operating unit 62.

In addition, the first operating unit 60 is rotatably supported by the rotary support portion 142 in the same way as in the first embodiment. Furthermore, the third operating unit 64 is disposed on a vertical wall portion 48a formed at a rear end portion of the upper cover 48.

Figure 13:
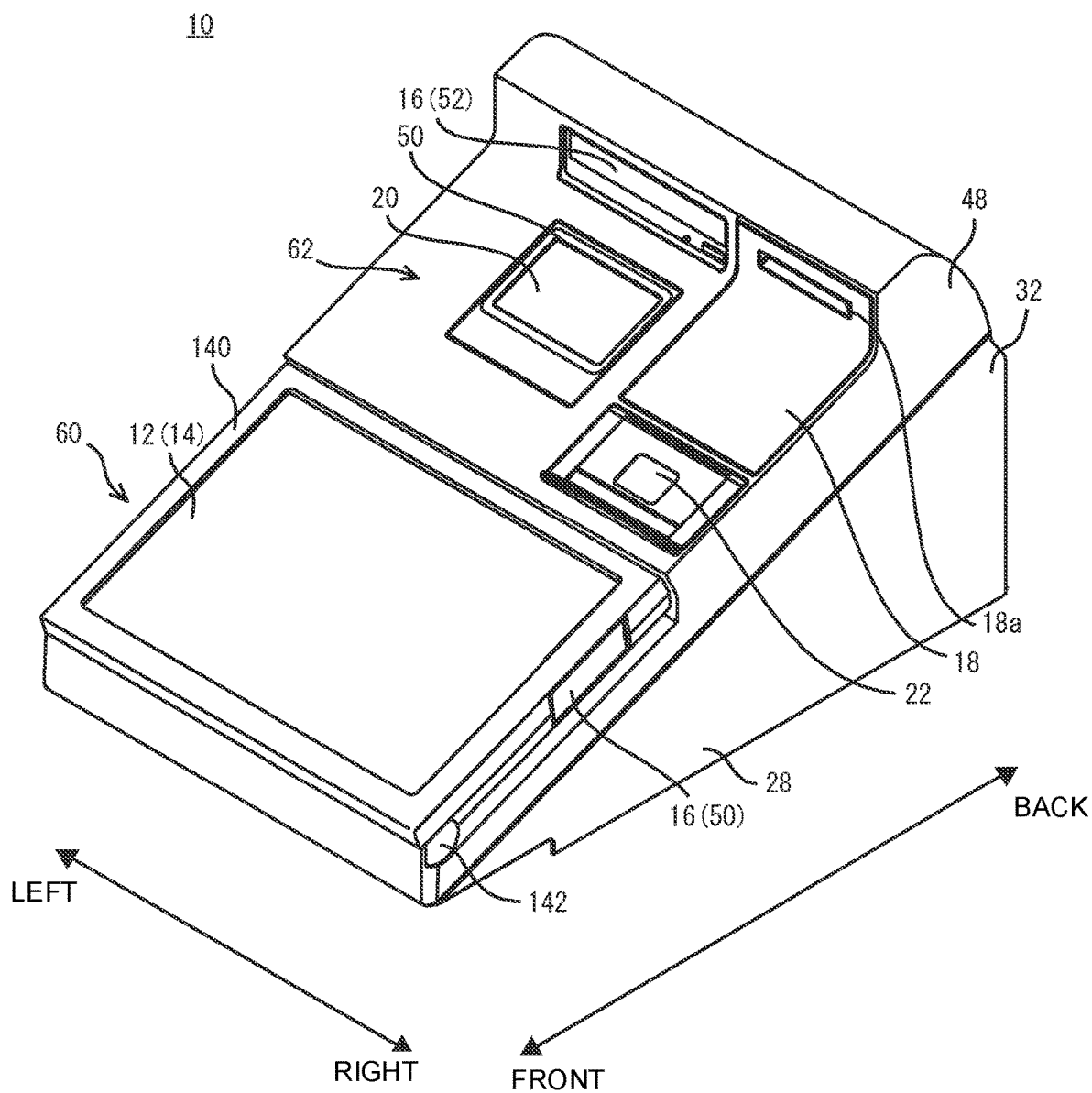
FIG. 13 is a perspective view illustrating an external configuration of the information processing device in a modified example.

Moreover, operating components other than the display 14 with the touch panel 12 may be included in the first operating unit 60 near side as seen from a user. For example, as illustrated in FIG. 13, the memory connection 50 may be included in the first operating unit 60. In this case, the memory connection 50 is disposed on the left/right outer surface (for example, the right surface) of the frame body 140.

According to the third embodiment, the upper surface of the first operating unit 60 and the upper surface of the second operating unit 62 are inclined in the same direction in the same way as in the first embodiment; therefore, the operability of a user can be improved.

In addition, the specific configurations or the like in the embodiments above are an example and can be changed as appropriate in accordance with actual products.

For example, the protrusion 360 for forming the opening 66 between the lower surface of the first operating unit 60 and the upper surface of the housing 28 may be disposed on the first operating unit 60.

Moreover, the four light emitters 232 are disposed on the placement section 220; however, the number of light emitters 232 is not limited to four. Three or less, (for example, one light emitter) or five or more light emitters may be provided.

What is claimed is:

1. An information processing device, comprising:
    a housing;
    a placement section that is disposed on the housing, the placement section having a portable communication object placed thereon; and
    a wireless communicator that wirelessly communicates with the communication object placed on the placement section, wherein
    a step, forming a gap between the placement section and the communication object, is disposed in a lower end portion of the placement section.

2. The information processing device according to claim 1, wherein the placement section is disposed entirely along a left-right direction of the lower end portion of the placement section and is provided with a recess extending in the left-right direction.

3. The information processing device according to claim 2, wherein an upper surface of the housing is an inclined surface sloping downward from a back side of the housing toward a front side of the housing, and
    an upper surface of the placement section includes a first inclined surface having an inclination angle identical to that of the upper surface of the housing and a second inclined surface connected to a front side of the first inclined surface, the second inclined surface forming a portion of the recess and sloping downward from the first inclined surface toward the front side.

4. The information processing device according to claim 1, wherein the placement section includes a second protrusion extending in a left-right direction at the lower end portion of the placement section and being lower than a first protrusion of the placement section that extends in the left-right direction along the lower end of the placement section.

5. The information processing device according to claim 1, further comprising one or more light emitters disposed on the placement section.

6. The information processing device according to claim 5, wherein the placement section is formed in a rectangular shape, and
    the one or more light emitters are disposed in each of four corner portions of the placement section.

7. The information processing device according to claim 6, further comprising a wireless communication mark disposed on the placement section and serving as an index of a location over which the communication object is held,
    wherein the wireless communication mark is arranged at a position in which diagonal lines of the four corner portions intersect on the placement section.

8. The information processing device according to claim 6, wherein the wireless communicator includes a wireless communication antenna built in the housing, and
    the wireless communication antenna is arranged at a position in which diagonal lines of the four corner portions intersect.

9. The information processing device according to claim 6, wherein two lower light emitters of four of the one or more light emitters are respectively disposed in opposite end portions of the first protrusion in a longitudinal direction thereof.

10. The information processing device according to claim 1, further comprising a first protrusion that extends in a left-right direction along a lower end of the placement section,
- wherein the placement section includes a placement section sloping downward from a back side of the placement section toward a front side of the placement section, and
- the first protrusion inhibits downward movement of the communication object.

* * * * *